US008949334B2

(12) United States Patent
Koukoumidis et al.

(10) Patent No.: US 8,949,334 B2
(45) Date of Patent: Feb. 3, 2015

(54) PUSH-BASED RECOMMENDATIONS

(75) Inventors: Emmanouil Koukoumidis, Bellevue, WA (US); Brian Beckman, Newcastle, WA (US); James Anthony Whittaker, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/558,642

(22) Filed: Jul. 26, 2012

(65) Prior Publication Data

US 2014/0032678 A1 Jan. 30, 2014

(51) Int. Cl.
G06F 15/16 (2006.01)
(52) U.S. Cl.
USPC ........... 709/204; 709/203; 709/219; 709/224; 709/206; 709/217
(58) Field of Classification Search
None
See application file for complete search history.

(56) References Cited

U.S. PATENT DOCUMENTS

| | | | |
|---|---|---|---|
| 7,720,720 B1 * | 5/2010 | Sharma et al. | 705/26.7 |
| 7,774,348 B2 | 8/2010 | Delli Santi et al. | |
| 8,150,741 B2 | 4/2012 | Figueroa et al. | |
| 2008/0248815 A1 * | 10/2008 | Busch | 455/456.5 |
| 2009/0049032 A1 | 2/2009 | Maghoul et al. | |
| 2009/0055355 A1 | 2/2009 | Brunner et al. | |
| 2010/0205199 A1 | 8/2010 | Lin et al. | |
| 2012/0030587 A1 * | 2/2012 | Ketkar | 715/751 |

FOREIGN PATENT DOCUMENTS

| | | |
|---|---|---|
| EP | 1679831 A2 | 12/2006 |
| WO | 2010/068427 A1 | 6/2010 |

OTHER PUBLICATIONS

Int. Search Report cited in PCT Application No. PCT/US2013/051756 dated Sep. 3, 2013, 9 pgs.
"Location-Aware Tye Ahead Search on Spatial Databases", Senjuty Basu Roy and Kaushik Chakrabarti, 2011, Proceedings of the 2011 ACM SIGMOD International Conference on Management of Data, 12 pgs.
"A Study on Ontology-Driven Geospatial-Information Retrieval Systems in the Semantic Web", Xu Quan-Li, Yang Kun, Wang Jun, Peng Shuant-Yun and Jun Hua, Jul. 3-11, 2008, International Society for Photogrammetry and Remote Sensing, vol. XXXVII, Part B2, pp. 733-738.
"A Framework for Mobile Intention Recognition in Spatially Structured Environments", Peter Kiefer and Klaus Stein, Sep. 23, 2008, in 2nd Workshop on Behavior Monitoring and Interpretation, 31st German Conference on Artificial Intelligence, pp. 28-41.
"Determining the User Intent of Web Search Engine Queries", Bernard J. Jansen, Danielle L. Booth and Amanda Spink, May 8, 2007, Proceedings of the 16th International Conference on World Wide Web, pp. 1149-1150.

* cited by examiner

*Primary Examiner* — Djenane Bayard
(74) *Attorney, Agent, or Firm* — Steven Spellman; Jim Ross; Micky Minhas

(57) ABSTRACT

Among other things, one or more techniques and/or systems are provided for pushing a recommendation to a user. That is, a recommendation may be pushed to a device of the user based upon a triggering event associated with the user. The recommendation may be provided, for example, without user solicitation for the recommendation. In one example, a recommendation component may observe that the user frequently stops for ice cream on Fridays after work (e.g., based upon prior social network check-ins). Accordingly, on the following Friday, the recommendation component may push a recommendation to the user's device to visit a particular grocery store on the way home from work that is within 10 minutes of the user's home so that the user can avoid melting ice cream (e.g., a location constraint may be applied to choose a grocery store that is relatively close to the user's home).

20 Claims, 9 Drawing Sheets

PUSH-BASED RECOMMENDATIONS

BACKGROUND

Many applications, services, and/or websites allow users to search for information, create organized schedules, share information, and/or perform a variety of other tasks. In one example, a search engine may provide a user with images, links to websites, and/or other search results in response to a search query submitted by the user. In another example, a calendar application may maintain a schedule of user defined events and user defined reminders in response to a user setting up such events and reminders. In another example, a mapping service may provide a user with a map comprising one or more coffee shops that are close in proximity to the current location of the user in response to the user submitting a search for coffee shops to the mapping service. In this way, the user may explicitly search for information, create events and reminders, and/or search for directions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for pushing a recommendation to a user are provided herein. The recommendation may be pushed to the user (e.g., without user solicitation) based upon a triggering event associated with the user. For example, a set of triggering events may be defined based upon observed user behavior (e.g., the user regularly calls his sister on Tuesday afternoon, the user gets ice cream on Fridays if the temperature is above 80°, the user will only detour for a gas station if the price of gas is more than 20 cents cheaper than a more conveniently located gas station, etc.), a change in a real world value (e.g., the temperature rises above 80°, a location of the user is near a particular landmark, a vehicle of the user is low on gas, etc.), an email indicating that an event is to occur, social network event data (e.g., the user's sister has an event scheduled through a social network that may prevent her from being available for Tuesday afternoon's phone call), and/or a variety of other observations associated with the user and/or aggregated from other users. In this way, an occurrence of a triggering event associated with the user may be identified.

One or more suggested entities corresponding to the triggering event may be determined. In one example, responsive to a Friday post office visit triggering event associated with observed user behavior (e.g., the user generally visits a post office after work on Fridays), one or more post offices may be determined as the one or more suggested entities. In another example, responsive to a phone call triggering event associated with observed user behavior (e.g., the user generally calls his sister on Tuesday afternoon), one or more call times at which the user may call his sister may be determined as the one or more suggested entities.

An entity selection criteria model may be constructed based upon one or more constraints derived from observation data associated with the triggering event. The entity selection criteria model may be based upon a weather constraint (e.g., a drive-in movie theater may be recommended based upon a sunny day), a gas constraint (e.g., a local gas station may be recommended based upon a vehicle having low gas), a traffic constraint (e.g., a new route may be recommended based upon current traffic conditions), a membership constraint (e.g., a store with which the user has a membership may be recommended), a price constraint (e.g., a store, with an acceptable detour, having a sale may be recommended), a coupon constraint, an hours of operation constraint, a distance to destination constraint (e.g., as opposed to merely a distance to current location constraint), a user preference constraint (e.g., the user generally prefers to shop at a particular grocery store), an observed behavior constraint (e.g., the user prefers to make work phone calls during the morning), and/or a variety of other constraints. It may be appreciated that in one example, an entity selection criteria model may be predefined (e.g., defined before the identification of a triggering event). For example, the entity selection criteria model may be constructed offline (e.g., instead of in real time or on the fly). For example, the entity selection criteria model may be constructed asynchronously while monitoring behavior of one or more users. Accordingly, upon identification of the triggering event, the entity selection criteria model may be available (e.g., already constructed) for utilization in creating a recommendation.

The entity selection criteria model may be applied to the one or more suggested entities to create a recommendation for the triggering event. In one example, the one or more suggested entities may be ranked based upon various factors, such as a convenience factor (e.g., the user generally visits a post office conveniently located along a route from work to home, as opposed to a post office closest to work), a price factor (e.g., the user may detour up to 2 miles to buy stamps that are on sale), a time factor (e.g., the user may be able to reach a first post office, but not a second post office, before closing), a user preference factor (e.g., the user prefers to visit a post office that is near a shopping plaza), and/or other factors derived from the entity selection criteria model. The recommendation may comprise a suggested entity selected from the one or more suggested entities. In this way, the recommendation may be pushed to a device associated with the user. It may be appreciated that in one example, the recommendation may be pushed without user solicitation. For example, a recommendation of a particular post office may be pushed to a user based upon prior user behavior of buying stamps on Fridays after work, without the user explicitly searching for post offices and/or setting up an event or reminder for visiting the post office.

The following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
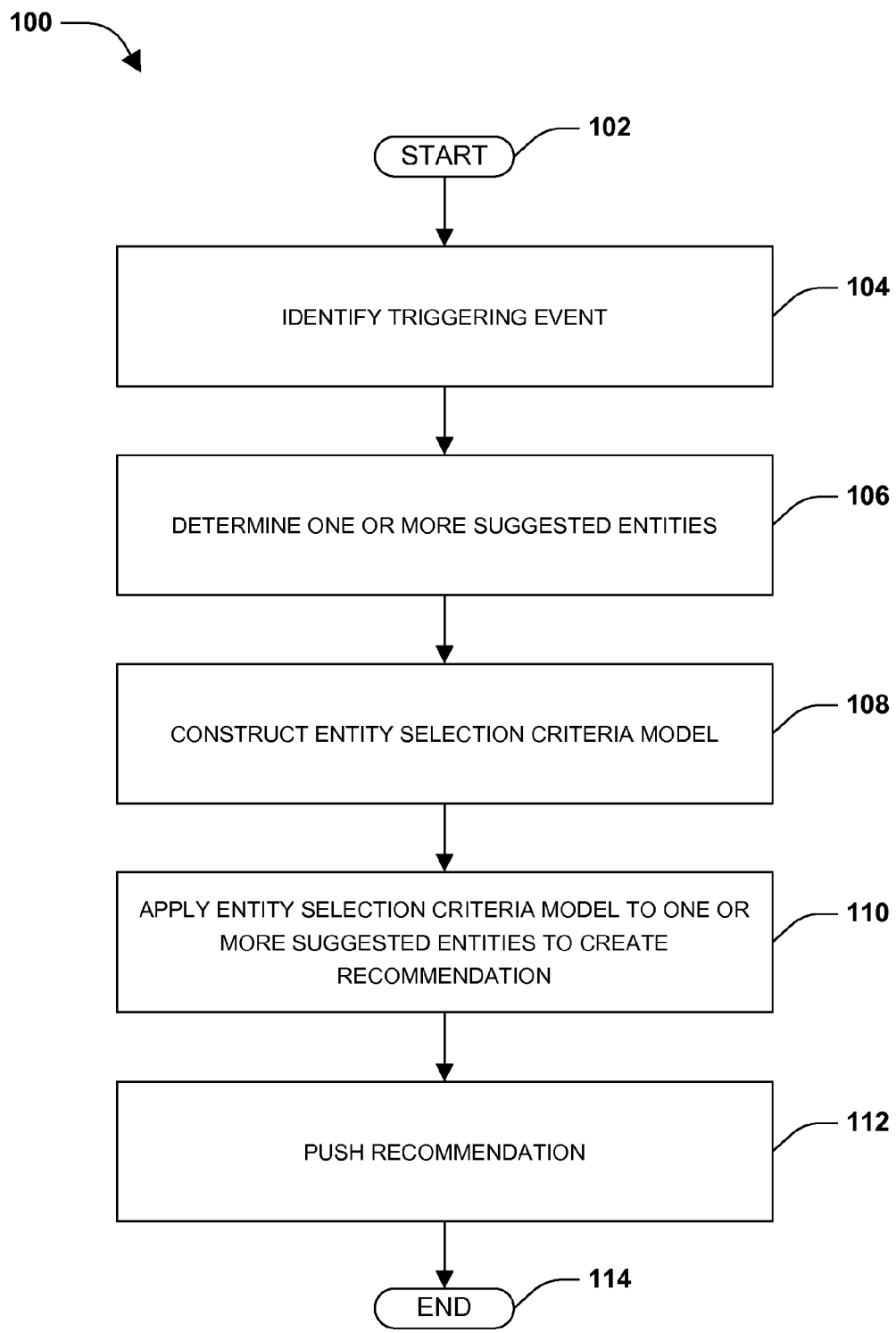
FIG. 1 is a flow diagram illustrating an exemplary method of pushing a recommendation to a user.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, users may search for directions through a mapping service, search for information through a search engine, organize events and reminders through a calendar application, and/or perform other actions based upon user solicitation (e.g., a user may explicitly schedule a reminder to call his sister, the user may explicitly search for a post office that is close to a current location of the user, etc.). Unfortunately, recommendations may not be provided to users without direct user solicitation. Accordingly, as provided herein, it may be advantageous to push recommendations to a user (e.g., without direct user solicitation).

One embodiment of pushing a recommendation to a user is illustrated by an exemplary method 100 in FIG. 1. At 102, the method starts. At 104, a triggering event associated with a user may be identified. In one example, the triggering event may correspond to an inference that a user will perform an activity. The inference may be based upon a prior occurrence of the activity by the user (e.g., the user likes to buy ice cream on Fridays when the weather is over 80°). In another example, a set of triggering events may be created based upon observed user behaviors of one or more users (e.g., users will generally detour, up to 5 miles, to save at least 20 cents per gallon on gas) and/or changes in real world values (e.g., a change in weather, a change in location of the user, an amount of gas within a vehicle, etc.). In this way, an occurrence of the triggering event within the set of triggering events may be identified. In another example, the triggering event may correspond to a scheduled event within a user calendar (e.g., a grocery shopping calendar event may be correlated with a temperature over 80° on Friday to recommend a grocery store that is near an ice cream shop), an email (e.g., expiration of an email coupon for a store may trigger a recommendation for the user to visit the store), social network data, an amount of gas in a vehicle, etc.

In one example, the triggering event may be based upon user data (e.g., publicly available data, data that the user has provided permission to use in pushing recommendations, data that the user has not opted out to use in pushing recommendations, etc.). For example, email, a calendar, prior search results selected by the user, prior map directions followed by the user, location check-in events, social network events with which the user has participated, and/or a variety of other sources may be mined for triggering event data. In another example, the triggering event may be based upon aggregated user data. For example, users of a mapping service generally choose to buy ice cream from grocery stores that are located within 5 miles from home to avoid melting.

At 106, one or more suggested entities corresponding to the triggering event may be determined. For example, a location, a business, a time (e.g., a proposed time to call a person), a driving route, an advertisement, a sequence of events, etc. may be determined as the one or more suggested entities. In one example, an entity selection criteria model may be constructed based upon one or more constraints derived from observation data associated with the triggering event, at 108. In another example, a pre-defined entity selection criteria model may be identified as the entity selection criteria model, at 108 (e.g., the pre-defined entity selection criteria model may be generated asynchronously, such as offline, based upon observed user behavior of one or more users over time). In one example of an entity selection criteria model, behavior of one or more users may be aggregated to generate a constraint (e.g., a distance to home constraint may be generated based upon users preferring to buy ice cream close to home). In another example, user preferences of one or more users may be aggregated to generate a constraint (e.g., a user prefers to buy a particular brand of cereal when the cereal is on sale; a user prefers to make business phone calls in the morning; users of a mapping application generally do not detour for gas that is merely a few cents cheaper than a conveniently located gas station along their route; etc.). In another example, a constraint may be generated based upon a real world value (e.g., a time constraint may be generated based upon a closing time of a post office; a directions constraint may be generated based upon current traffic conditions; a price constraint may be generated based upon a coupon held by a user; etc.). In this way, the entity selection criteria model may be constructed from one or more constraints, such as a weather constraint, a gas constraint, a traffic constraint, a membership constraint, a price constraint, a coupon constraint, an hours of operation constraint, a user preference constraint, a distance to destination constraint, a parking lot to destination constraint, a time constraint, and/or an observed behavior constraint, etc.

At 110, the entity selection criteria model may be applied to the one or more suggested entities to create a recommendation for the triggering event. The recommendation may comprise a suggested entity selected from the one or more suggested entities. In one example, the one or more suggested entities may be ranked based upon various factors derived from the entity selection criteria model (e.g., a factor may correspond to one or more constraints used to generate the entity selection criteria model). For example, the one or more suggested entities may be ranked based upon a convenience factor (e.g., a store may be ranked based upon how conveniently located the store is along a driving route of the user, as opposed to how close the store is to a current location of the user, which may otherwise result in a detour from the driver's current driving route), a price factor (e.g., a first store, necessitating a detour from the driver's current driving route, with a lower price may be ranked higher than a second store with a higher price if the first store is within an acceptable detour threshold for the user), a time factor (e.g., a store that may be closed by the time the user reaches the store may be assigned a relatively low rank), and/or a variety of other factors. In this way, the recommendation may be created.

At 112, the recommendation may be pushed to a device associated with the user (e.g., a mobile device, a computing device within a vehicle, a tablet device, a desktop device, a laptop device, a device hosting a mapping service, etc.). In one example of pushing the recommendation, a push time may be determined based upon one or more constraints (e.g., an hours of operation constraint, a current location constraint, etc.) within the entity selection criteria model. For example, a buy ice cream trigger may result in a recommendation of an ice cream store near the user's home. Even though the user may not have solicited the recommendation and/or specified a push time for the recommendation, the recommendation may be pushed to the user at a push time that may provide the user with adequate notice to reach the store before the store closes. In this way, the recommendation may be pushed to the device at the push time. At 114, the method ends.

Figure 2:
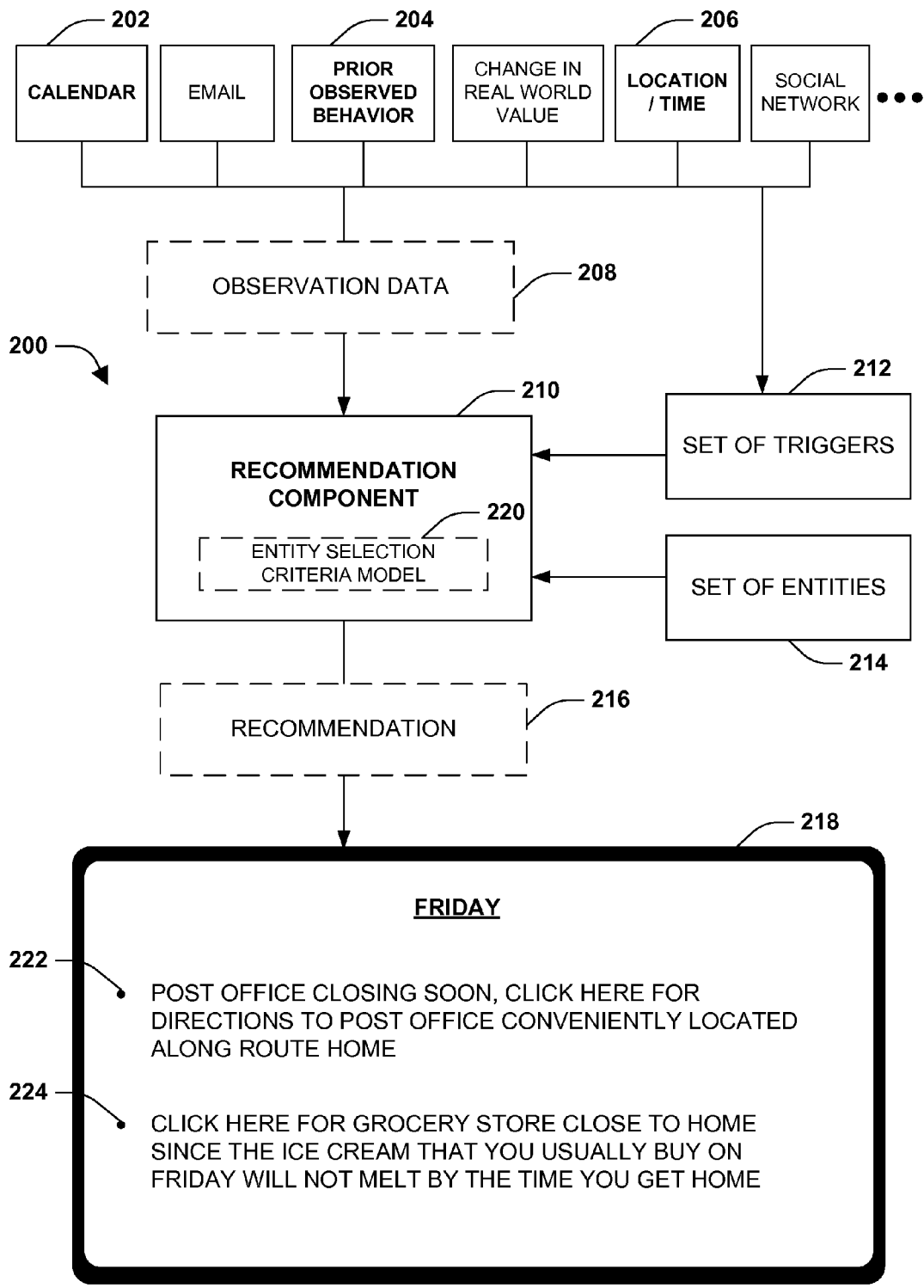
FIG. 2 is a component block diagram illustrating an exemplary system for pushing a recommendation to a user.

FIG. 2 illustrates an example of a system 200 configured for pushing a recommendation 216 to a user. The system 200 may comprise a recommendation component 210 configured to push the recommendation 216 to a device 218 of a user. The recommendation component 210 may be configured to identify a triggering event associated with the user. For example, a set of triggers 212 comprising one or more triggering events that may be triggered for the user (e.g., and/or other users) may be maintained by the recommendation component 210. In one example, the set of triggers 212 may comprise a first triggering event specifying that the user generally buys stamps on Friday after work, which may be been created from prior observed behavior of the user (e.g., prior observed behavior 204). The set of triggers 212 may comprise a second triggering event specifying that the user has a note on the user's calendar to buy ice cream, which may have been created from a calendar of the user (e.g., calendar 202). In this way, the set of triggers 212 may comprise a variety of triggers that may have been created based upon various information, such as prior observed behavior of the user, aggregated observed behavior of other users, changes in real world values (e.g., a current location of a user may be relatively close to a landmark that the user has previously expressed interest in through an email to a friend), etc.

The recommendation component 210 may be configured to determine one or more suggested entities corresponding to the triggering event. For example, the recommendation component may select one or more post office branches, one or more grocery stores, one or more gas stations, and/or other suggested entities from within a set of entities 214. The recommendation component 210 may be configured to identify (e.g., identify a pre-constructed entity selection criteria model as the entity selection criteria model 220) and/or construct (e.g., construct a new entity selection criteria model as the entity selection criteria model 220) an entity selection criteria model 220 based upon one or more constraints derived from observation data 208 associated with the triggering event. In one example, a time constraint may specify that the grocery store and/or the post office branch should be open for business by the time the user can reach them (e.g., based upon location and time data 206). In another example, an ordering constraint may specify that the post office branch should be visited before the grocery store because post office branches generally close before grocery stores (e.g., based upon real world values, such as closing times of businesses). In another example, a convenience constraint may specify that the post office should be located conveniently along a driving route home based upon the user expressing a disinterest in taking detours (e.g., based upon prior observed behavior 204). In another example, a distance to destination constraint may specify that the grocery store should be located within 10 minutes of the user's home because users generally buy ice cream close to home to avoid melting (e.g., based upon prior observed behavior 204). In this way, various constraints may be derived from the observation data 208, and may be used to construct the entity selection criteria model 220.

The recommendation component 210 may be configured to apply the entity selection criteria model 220 to the one or more suggested entities to create the recommendation 216 for the triggering event. The recommendation 216 may comprise a suggested entity (e.g., a first suggested entity 222, a second suggested entity 224, and/or other suggested entity not illustrated) selected from the one or more suggested entities. For example, the recommendation 216 may comprise the first suggested entity 222 specifying that a particular post office, conveniently located along the user's driving route home, is closing soon. The recommendation 216 may provide directions for the user to navigate to the post office so that the user can buy stamps before the post office closes (e.g., which the user regularly does on Fridays after work as identified from the prior observed behavior 204). The recommendation 216 may comprise the second suggested entity 224 specifying that a particular grocery store is located close the user's home, such that the user may buy ice cream close to home to avoid melting (e.g., which the user regularly does on Fridays after work as identified from the prior observed behavior 204). The recommendation component 210 may push the recommendation 216 to the device 218 of the user at a push time (e.g., an hour before work ends) that may provide the user with adequate time to follow the recommendation 216.

Figure 3:
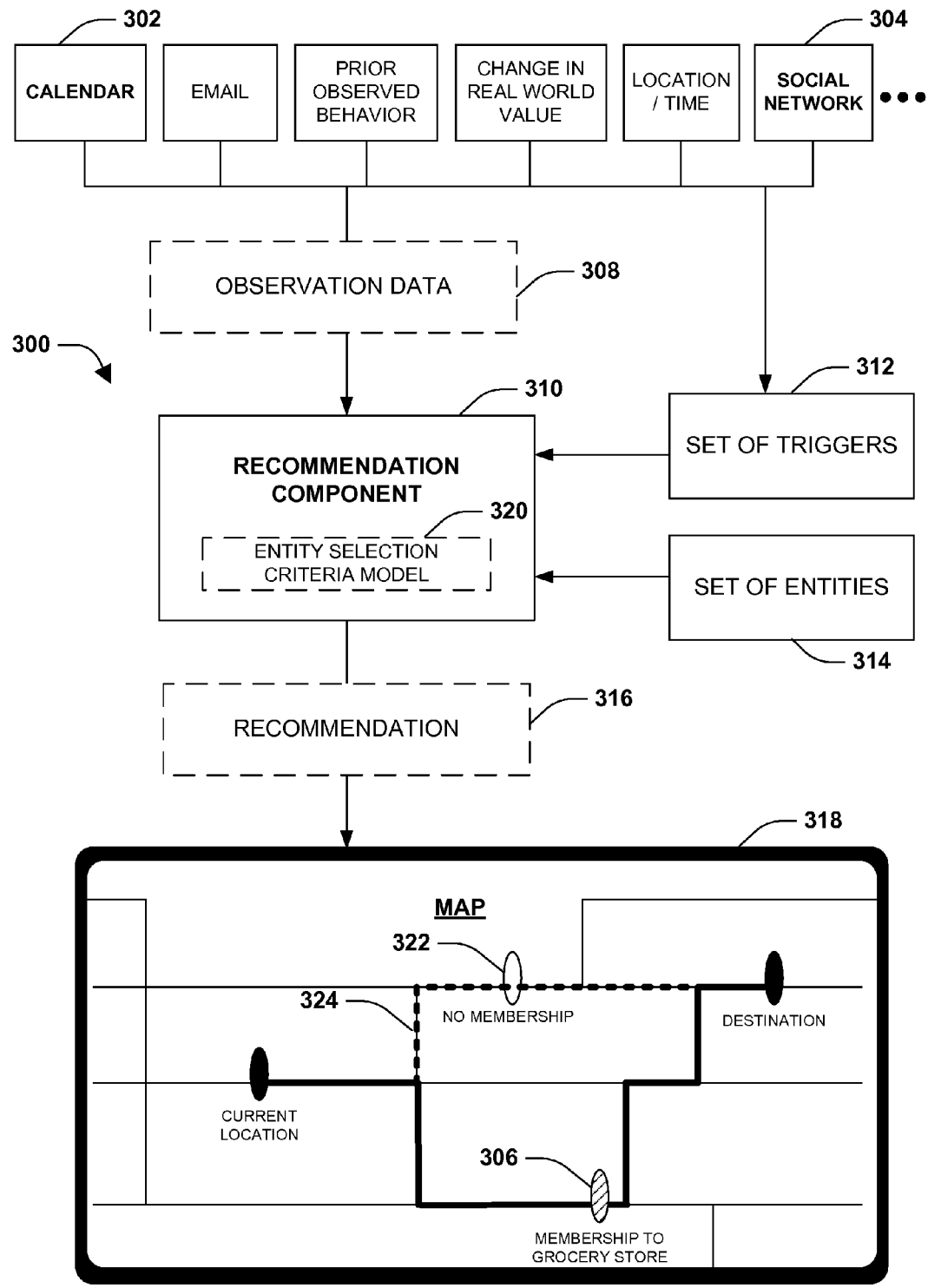
FIG. 3 is a component block diagram illustrating an exemplary system for pushing a recommendation, through a mapping application, to a user.

FIG. 3 illustrates an example of a system 300 configured for pushing a recommendation 316 to a user. The system 300 may comprise a recommendation component 310 configured to push the recommendation 316 to a device 318 of a user. The recommendation component 310 may be configured to identifying a triggering event associated with the user. For example, a set of triggers 312 comprising one or more triggering events that may be triggered for the user (e.g., and/or other users) may be maintained by the recommendation component 310. In one example, the set of triggers 312 may comprise a triggering event specifying that the user desires to grocery shop on Monday, which may have been created from a calendar entry of the user (e.g., calendar 302). However, the calendar entry may not specify a time and/or a particular grocery store. In this way, the triggering event may be triggered based upon the current date being Monday.

The recommendation component 310 may be configured to determine one or more suggested entities corresponding to the triggering event. For example, the recommendation component may select one or more grocery stores from within a set of entities 314 (e.g., a first grocery store 322 with which the user does not have a membership, a second grocery store 306 with which the user has a membership, and/or other grocery stores that may be relevant to the triggering event). The recommendation component 310 may be configured to identify (e.g., identify a pre-constructed entity selection criteria model as the entity selection criteria model 320) and/or construct (e.g., construct a new entity selection criteria model as the entity selection criteria model 320) an entity selection criteria model 320 based upon one or more constraints derived from observation data 308 associated with the triggering event. In one example, a membership constraint may specify that the user has a price discount membership to the second grocery store 306, which may have been derived from social network data 304. A convenience constraint may specify that the user is willing to detour 5 minutes to obtain cheaper prices when grocery shopping. In this way, various constraints may be derived from the observation data 308, and may be used to construct the entity selection criteria model 320.

The recommendation component 310 may be configured to apply the entity selection criteria model 320 to the one or more suggested entities to create the recommendation 316 for the triggering event. The recommendation 316 may comprise a suggested entity selected from the one or more suggested entities. For example, the recommendation 316 may comprise the second grocery store 306 because the user has a membership to the second grocery store 306 and the second grocery store less than a 5 minute detour from the user's original route (e.g., original route 324). The recommendation 316 may comprise the second grocery store 306, but not the first grocery store 322, because the second grocery store 306 may be ranked relatively higher than the first grocery store 322 based upon the user having a membership to the second grocery store 306 (e.g., even though the first grocery store is more conveniently located along the original route 324). The recommendation component 310 may push the recommendation 316 to the device 318 of the user.

Figure 4:
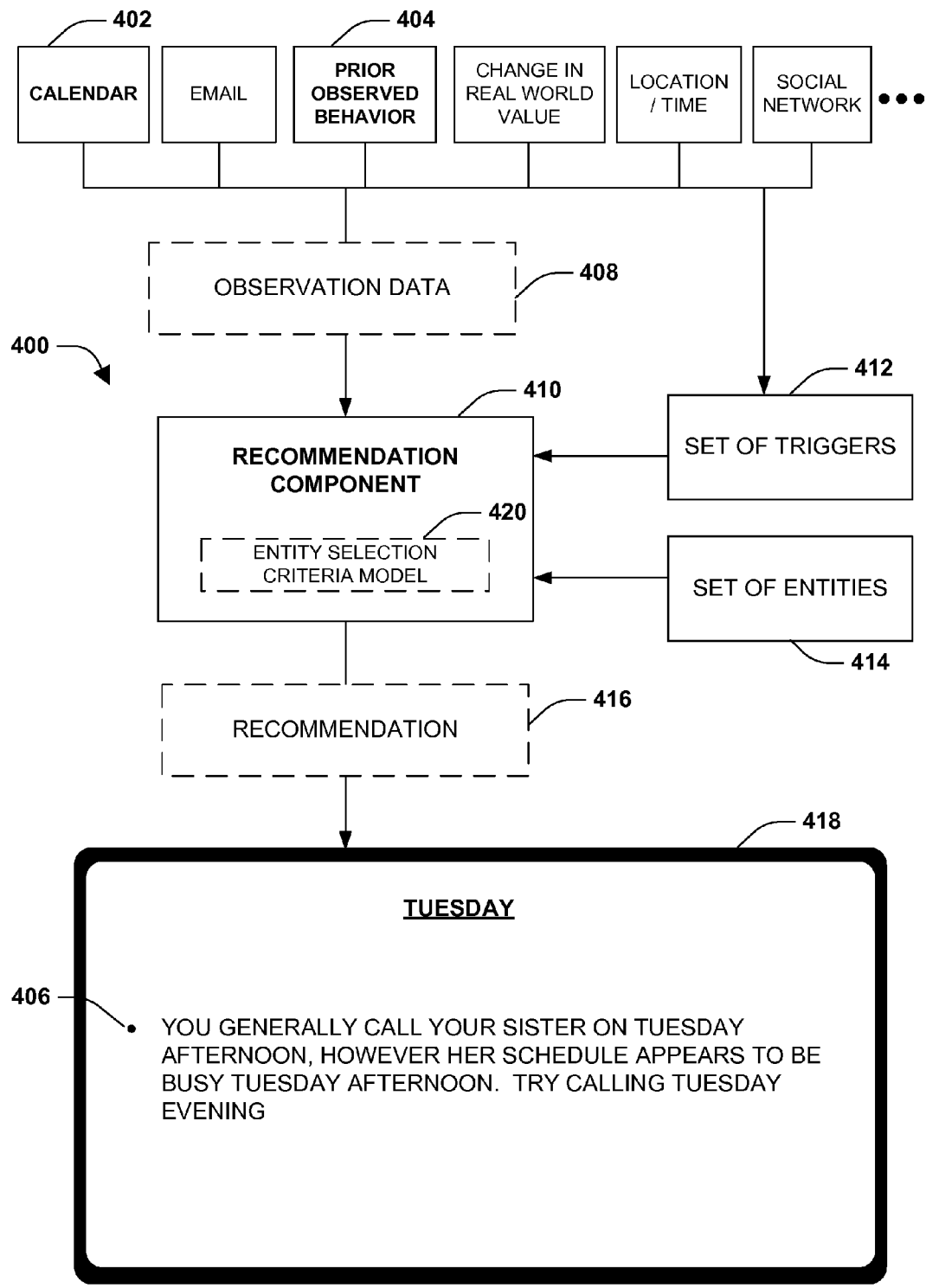
FIG. 4 is a component block diagram illustrating an exemplary system for pushing a recommendation to a user.

FIG. 4 illustrates an example of a system 400 configured for pushing a recommendation 416 to a user. The system 400 may comprise a recommendation component 410 configured to push the recommendation 416 to a device 418 of a user. The recommendation component 410 may be configured to identifying a triggering event associated with the user. For example, a set of triggers 412 comprising one or more triggering events that may be triggered for the user (e.g., and/or other users) may be maintained by the recommendation component 410. In one example, the set of triggers 412 may comprise a triggering event specifying that the user calls his sister on Tuesday afternoons. The triggering event may be based upon prior observed behavior 404 of the user (e.g., the user generally calls his sister on Tuesday afternoons). In this way, the triggering event may be triggered based upon the current date being Tuesday morning.

The recommendation component 410 may be configured to determine one or more suggested entities corresponding to the triggering event. For example, the recommendation component may select one or more suggested calling times from within a set of entities 414. The recommendation component 410 may be configured to identify (e.g., identify a pre-constructed entity selection criteria model as the entity selection criteria model 320) and/or construct (e.g., construct a new entity selection criteria model as the entity selection criteria model 320) an entity selection criteria model 420 based upon one or more constraints derived from observation data 408 associated with the triggering event. In one example, a scheduling constraint may specify that the sister has a scheduled appointment on Tuesday afternoon, but is free Tuesday evening (e.g., based upon calendar 402). In this way, various constraints may be derived from the observation data 408, and may be used to construct the entity selection criteria model 420.

The recommendation component 410 may be configured to apply the entity selection criteria model 420 to the one or more suggested entities to create the recommendation 416 for the triggering event. The recommendation 416 may comprise a suggested entity selected from the one or more suggested entities. For example, the recommendation 416 may comprise a suggested evening calling time 406, such that the user may call his sister when the sister is available. The recommendation component 410 may push the recommendation 416 to the device 418 of the user.

Figure 5:
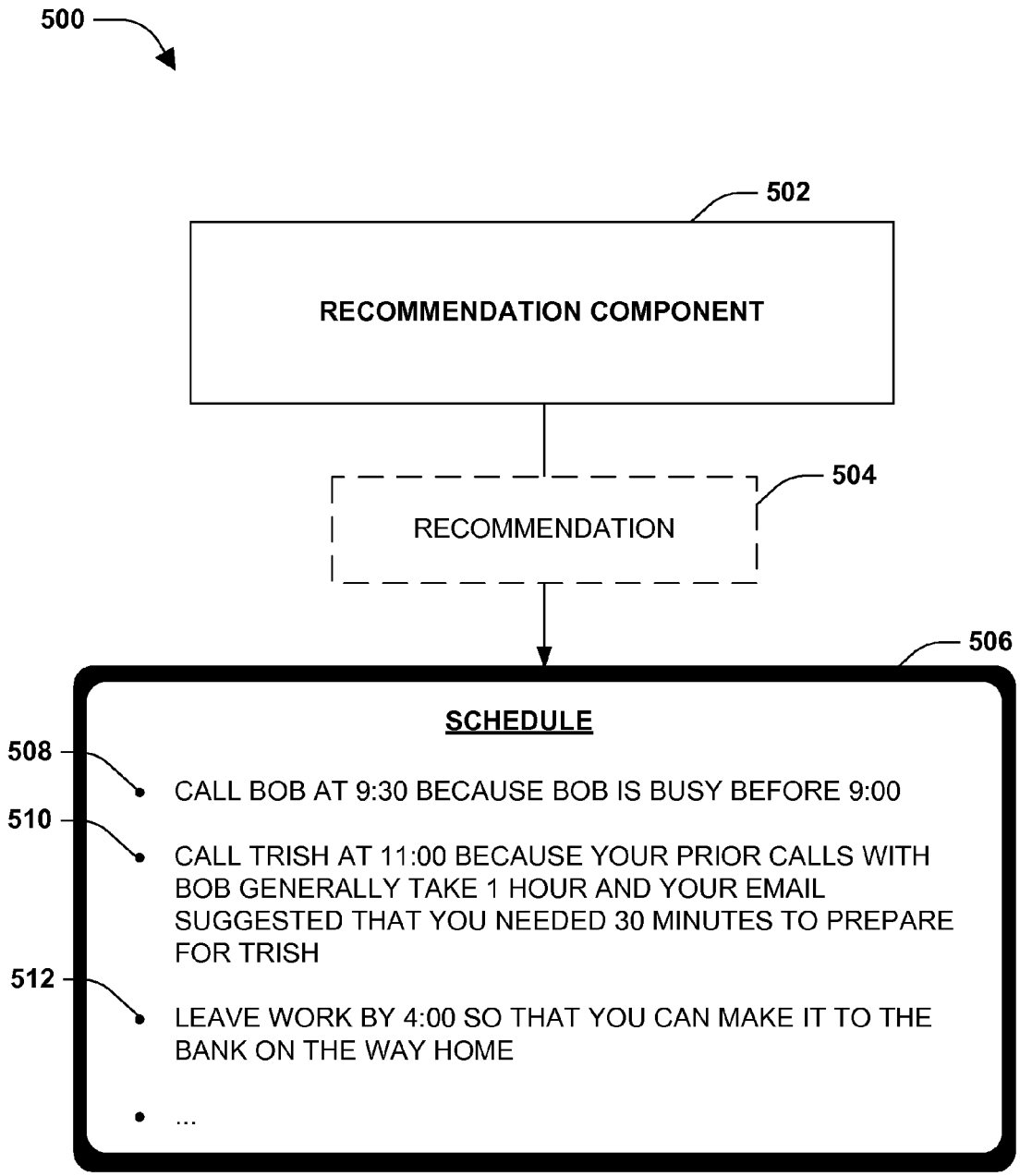
FIG. 5 is a component block diagram illustrating an exemplary system for pushing a recommendation comprising a sequence of events to a user.

FIG. 5 illustrates an example of a system 500 configured for pushing a recommendation 504 to a user. The system 500 may comprise a recommendation component 502 configured to push the recommendation 504 to a device 506 of a user based upon a triggering event (e.g., the current day being Friday where the user is to call Bob, call Trish, and prepare for an amusement park trip). For example, the recommendation component 502 may determine that the user is to call Bob (e.g., based upon a calendar entry), call Trish (e.g., based upon prior user behavior of calling Trish on Fridays), and stop by the bank on Friday (e.g., based upon an email indicating that the user will need cash for an amusement park this weekend). In this way, the recommendation component 502 may determine one or more suggested entities corresponding to the triggering event, such as one or more suggested calling times for Bob, one or more suggested calling times for Trish, one or more banks, etc.

The recommendation component 502 may construct an entity selection criteria model based upon one or more constraints derived from observation data (e.g., a user preference constraint that the user generally prefers to make phone calls in the morning based upon prior phone behavior of the user; a first time constraint that the user will need 30 minutes to prepare for the phone call with Trish; a second time constraint that the user will be on the phone with Bob for an hour based upon prior phone behavior between the user and Bob; an hours of operation constraint for the user to reach the bank before the bank closes; etc.). In this way, the recommendation component 502 may apply the entity selection criteria model to the one or more suggested entities to create the recommendation 504. For example, the recommendation 504 may comprise a first suggested entity 508 recommending the user to call Bob at 9:30 because Bob is busy before 9:00, a second suggested entity 510 recommending the user to call Trish at 11:00 so that the user has time to adequately prepare for the phone call (e.g., the user may need 30 minutes to prepare, and the phone call with Bob generally takes 1 hour), and/or a third suggested entity 512 recommending the user to leave work by 4:00 so that the user can reach a particular bank conveniently located along a driving route home. In this way, the recommendation 506 may comprise a sequence of events (e.g., phone calls, bank visits, etc.) that may be recommended to the user. The recommendation 504 may be pushed to the device 506 of the user.

Figure 6:
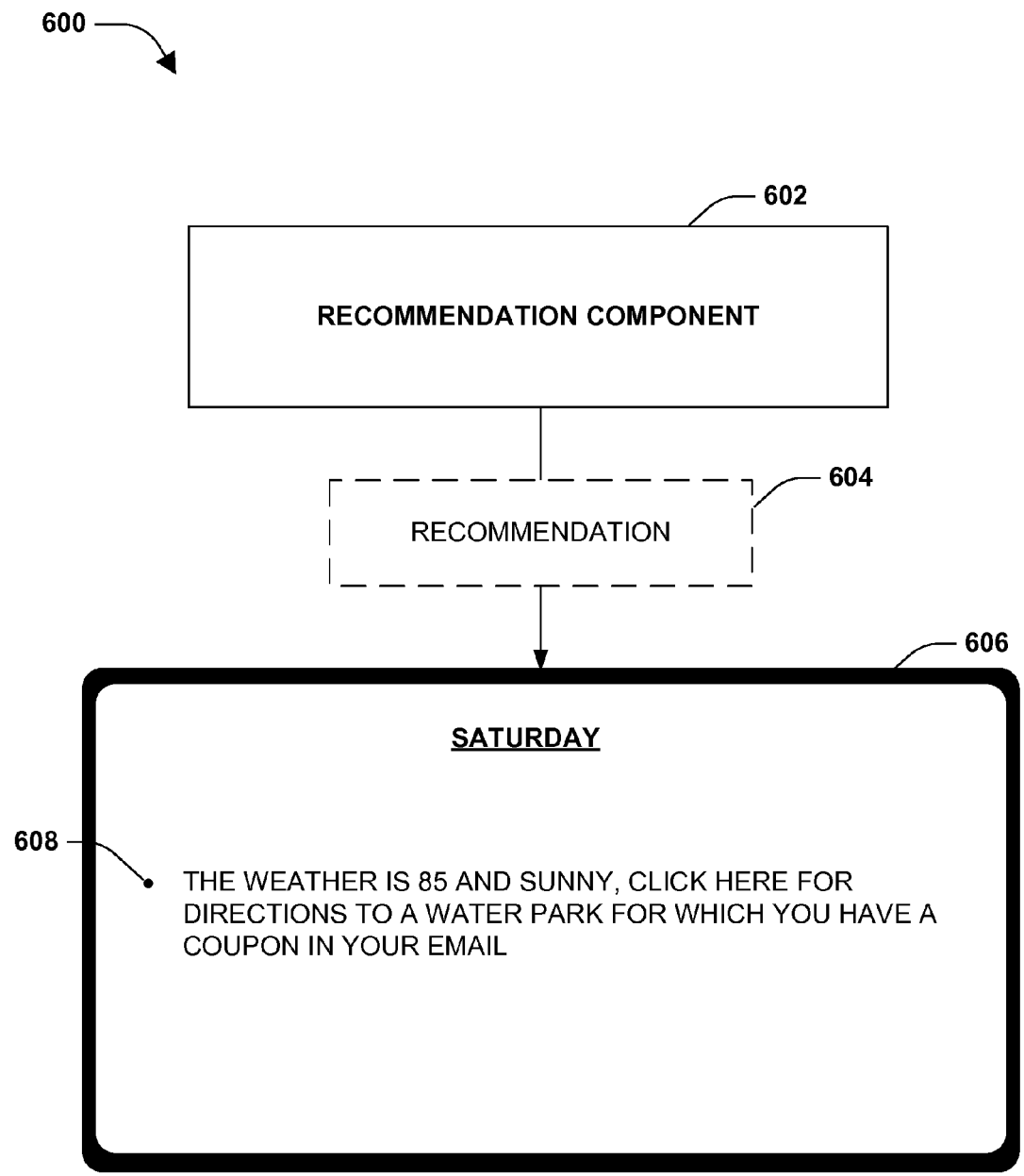
FIG. 6 is a component block diagram illustrating an exemplary system for pushing a recommendation to a user.

FIG. 6 illustrates an example of a system 600 configured for pushing a recommendation 604 to a user. The system 600 may comprise a recommendation component 602 configured to push the recommendation 604 to a device 606 of a user based upon a triggering event (e.g., a change in a real world value, such as the weather). For example, the recommendation component 602 may determine that the weather is 85° and sunny, and that the user has an interest in swimming at water parks. In this way, the recommendation component 602 may determine one or more suggested entities corresponding to the triggering event, such as one or more water parks.

The recommendation component 602 may construct an entity selection criteria model based upon one or more constraints derived from observation data (e.g., a location constraint, a coupon constraint, etc.). The recommendation component 602 may apply the entity selection criteria model to the one or more suggested entities to create the recommendation 604. For example, the recommendation 604 may comprise a first suggested entity 608 recommending that the user visit a water park for which the user has a coupon. In this way, the recommendation 604 may comprise directions for the water park, a link to an email comprising the coupon, and/or other information. The recommendation 604 may be pushed to the device 606 of the user.

Figure 7:
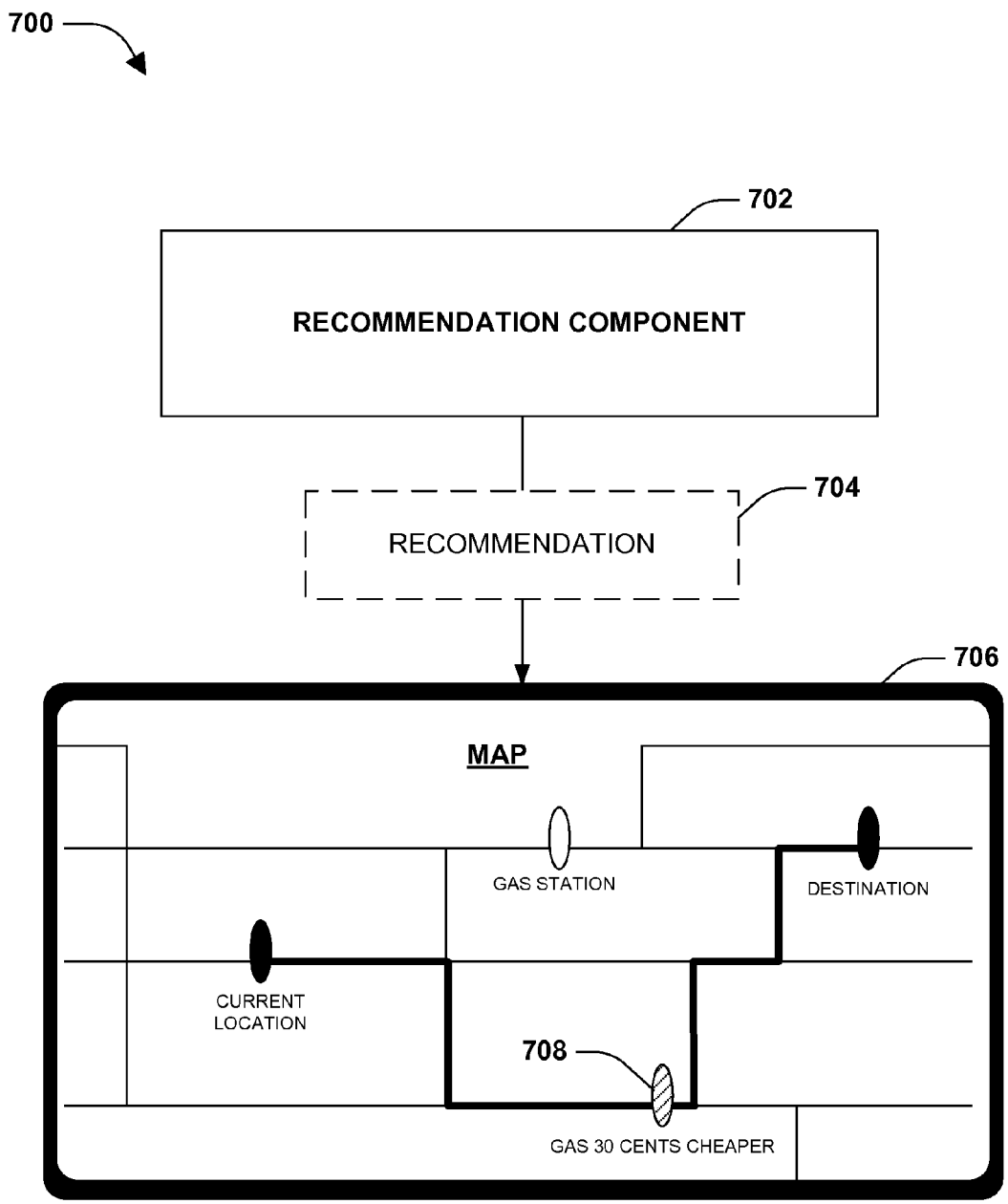
FIG. 7 is a component block diagram illustrating an exemplary system for pushing a recommendation, through a mapping application, to a user.

FIG. 7 illustrates an example of a system 700 configured for pushing a recommendation 704 to a user. The system 700 may comprise a recommendation component 702 configured to push the recommendation 704 to a device 706 of a user based upon a triggering event (e.g., an amount of gas in a vehicle of the user). For example, the recommendation component 702 may determine that the amount of gas in the vehicle is below 10%. In this way, the recommendation component 702 may determine one or more suggested entities corresponding to the triggering event, such as one or more gas stations.

The recommendation component 702 may construct an entity selection criteria model based upon one or more constraints derived from observation data (e.g., a location constraint, a price constraint, a detour constraint, etc.). For example, users may generally be willing to detour 5 minutes or less to save 25 cents or more on gas). The recommendation component 702 may apply the entity selection criteria model to the one or more suggested entities to create the recommendation 704. For example, the recommendation 704 may comprise a first suggested entity 708 recommending a first gas station that is within a 5 minute detour of an original driving route and has gas that is 30 cents cheaper than a gas station that may be more conveniently located along the original driving route. In this way, the recommendation 704 may comprise a new route for the user that may direct the user to the first gas station. The recommendation 704 may be pushed to the device 706 of the user.

Figure 8:
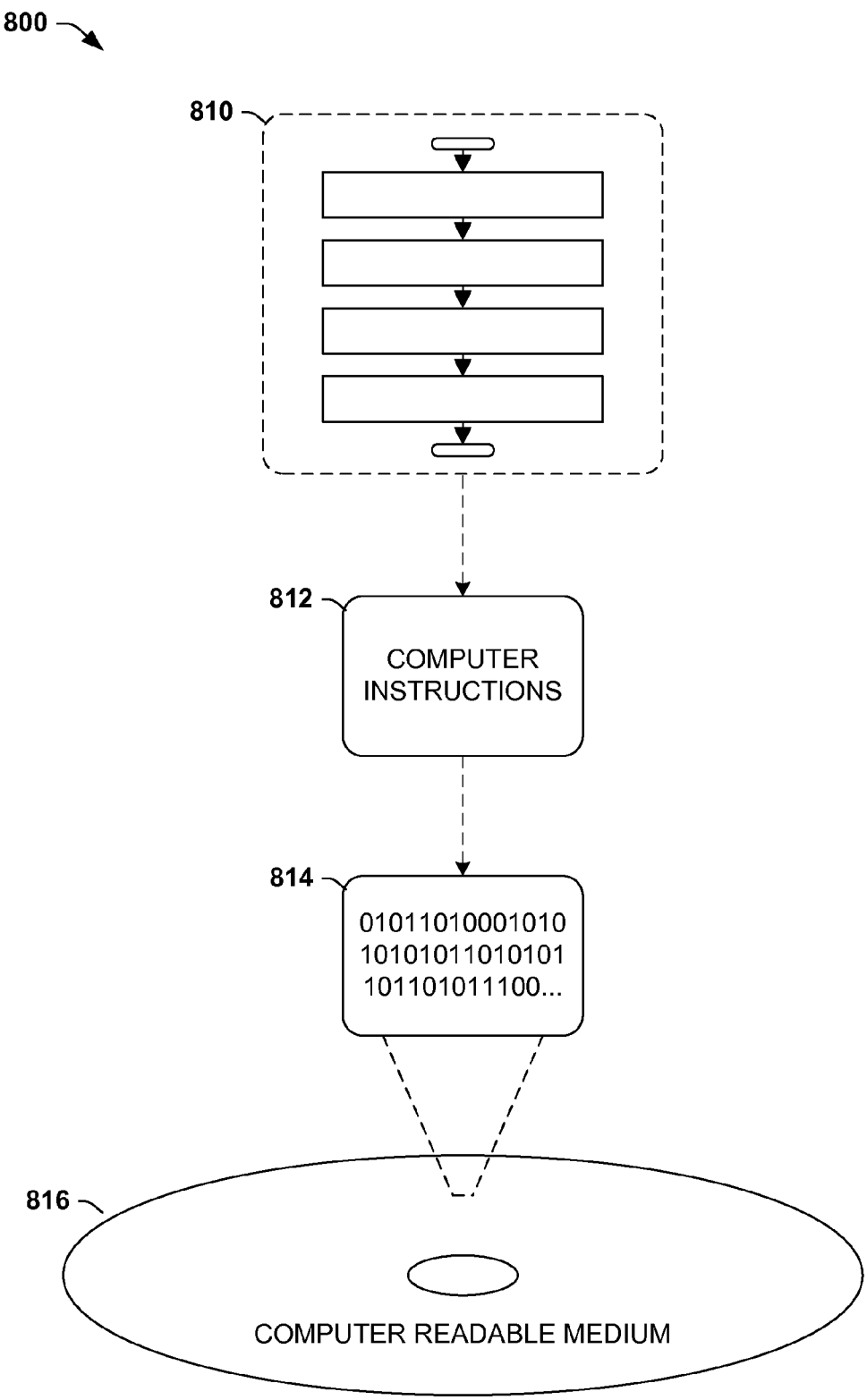
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 100 of FIG. 1, for example. In another such embodiment, the processor-executable instructions 812 may be configured to implement a system, such as at least some of the exemplary system 200 of FIG. 2, at least some of exemplary system 300 of FIG. 3, at least some of exemplary system 400 of FIG. 4, at least some of exemplary system 500 of FIG. 5, and/or at least some of exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
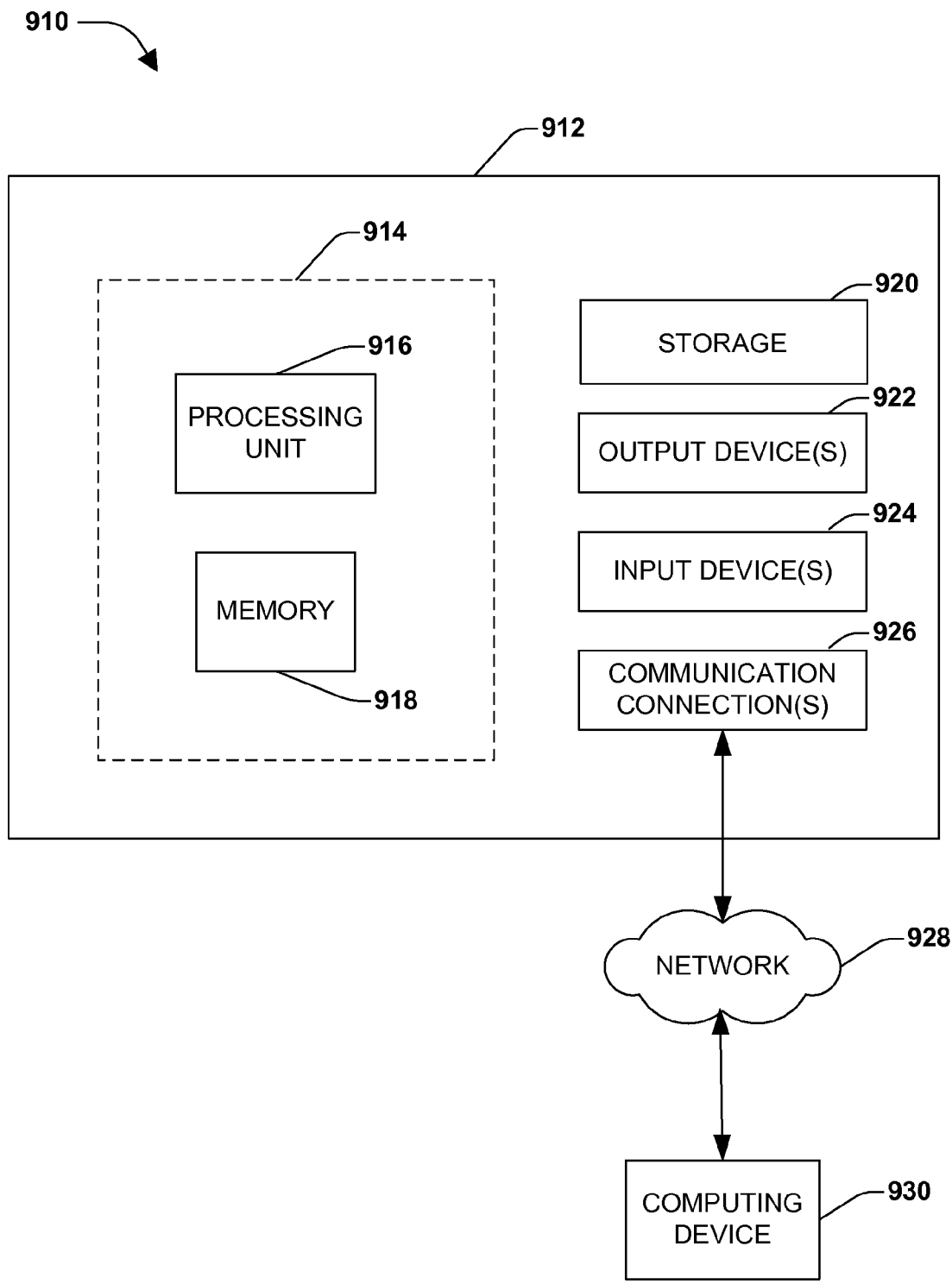
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for pushing a recommendation to a user, comprising:
    identifying a triggering event associated with a user;
    determining one or more suggested entities corresponding to the triggering event, the one or more suggested entities comprising a first suggested entity and a second suggested entity, the first suggested entity having a first rank in association with a first factor, the second suggested entity having a second rank in association with the first factor, the first suggested entity having a third rank in association with a second factor, the second suggested entity having a fourth rank in association with the second factor, the first rank lower than the second rank, the third rank higher than the fourth rank;
    constructing an entity selection criteria model based upon one or more constraints derived from observation data associated with the triggering event;
    applying the entity selection criteria model to the one or more suggested entities to create a recommendation for the triggering event, the recommendation comprising the first suggested entity but not the second suggested entity based upon the first rank being lower than the second rank and the third rank being higher than the fourth rank; and
pushing the recommendation to a device associated with the user.

2. The method of claim 1, the triggering event corresponding to an inference that the user will perform an activity.

3. The method of claim 2, comprising:
creating the inference based upon a prior occurrence of the activity by the user.

4. The method of claim 1, the triggering event corresponding to at least one of a scheduled event within a user calendar, an email associated with the user, social network data for the user, an observed behavior, a change in a real world value, or an amount of gas within a vehicle of the user.

5. The method of claim 1, the constructing an entity election criteria model comprising:
constructing the entity selection criteria model based upon at least one of a weather constraint, a gas constraint, a traffic constraint, a membership constraint, a price constraint, a coupon constraint, an hours of operation constraint, a user preference constraint, a distance to destination constraint, a parking lot to destination distance constraint, a time constraint, or an observed behavior constraint.

6. The method of claim 1, the pushing comprising at least one of:
pushing the recommendation to a computing device associated with a vehicle of the user; or
pushing the recommendation to a map.

7. The method of claim 1, the pushing comprising:
pushing the recommendation without user solicitation for the recommendation.

8. The method of claim 1, the pushing comprising:
determining a push time based upon one or more constraints within the entity selection criteria model, the push time not predefined by the user; and
pushing the recommendation at the push time.

9. The method of claim 8, the determining a push time comprising:
determining the push time based upon at least one of an hours of operation constraint or a current location constraint.

10. The method of claim 1, the recommendation comprising a sequence of suggested entities corresponding to a sequence of events.

11. The method of claim 1, the constructing comprising at least one of:
aggregating behavior of one or more users to generate a constraint;
aggregating user preferences of one or more users to generate the constraint; or
generating a constraint based upon a real world value.

12. The method of claim 1, comprising:
creating a set of triggering events based upon an observed user behavior that is triggered based upon a change in a real world value.

13. The method of claim 1, the first factor corresponding to distance from the user.

14. The method of claim 1, the second factor corresponding to price.

15. A system for pushing a recommendation to a user, comprising:
one or more processing units; and
memory comprising instructions that when executed by at least one of the one or more processing units implement at least some of:
a recommendation component configured to:
identify a triggering event associated with a user;
determine one or more suggested entities corresponding to the triggering event, the one or more suggested entities comprising a first suggested entity and a second suggested entity, the first suggested entity having a first rank in association with a first factor, the second suggested entity having a second rank in association with the first factor, the first suggested entity having a third rank in association with a second factor, the second suggested entity having a fourth rank in association with the second factor, the first rank lower than the second rank, the third rank higher than the fourth rank;
construct an entity selection criteria model based upon one or more constraints derived from observation data associated with the triggering event;
apply the entity selection criteria model to the one or more suggested entities to create a recommendation for the triggering event, the recommendation comprising the first suggested entity but not the second suggested entity based upon the first rank being lower than the second rank and the third rank being higher than the fourth rank; and
push the recommendation to a device associated with the user.

16. The system of claim 15, the recommendation component configured to:
create an inference that a user will perform an activity based upon a prior occurrence of the activity by the user; and
identify the triggering event based upon the inference.

17. The system of claim 15, the recommendation component configured to:
push the recommendation without user solicitation for the recommendation.

18. The system of claim 15, the recommendation component configured to:
determine a push time based upon one or more constraints within the entity selection criteria model, the push time not predefined by the user; and
push the recommendation at the push time.

19. The system of claim 15, the observation data comprising at least one of a prior user activity, a pattern of user behavior, a user product preference, a user business preference, a user time preference, or a user price preference.

20. A computer-readable medium, excluding signals, comprising processor-executable instructions that when executed perform a method for pushing a recommendation to a user, comprising:
identifying a triggering event associated with a user;
determining one or more suggested entities corresponding to the triggering event, the one or more suggested entities comprising a first suggested entity and a second suggested entity, the first suggested entity having a first rank in association with a first factor, the second suggested entity having a second rank in association with the first factor, the first suggested entity having a third rank in association with a second factor, the second suggested entity having a fourth rank in association with the second factor, the first rank lower than the second rank, the third rank higher than the fourth rank;
identifying an entity selection criteria model constructed based upon one or more constraints derived from observation data associated with the triggering event;
applying the entity selection criteria model to the one or more suggested entities to create a recommendation for the triggering event, the recommendation comprising the first suggested entity but not the second suggested entity based upon the first rank being lower than the second rank and the third rank being higher than the fourth rank; and pushing the recommendation to a device associated with the user.

* * * * *